(12) United States Patent
Husoy et al.

(10) Patent No.: US 8,417,357 B2
(45) Date of Patent: Apr. 9, 2013

(54) METHOD AND SYSTEM FOR GENERATING A CONTROL SYSTEM USER INTERFACE

(75) Inventors: Kristoffer Husoy, Oslo (NO); Torgeir Enkerud, Oslo (NO)

(73) Assignee: ABB Research Ltd., Zürich (CH)

( * ) Notice: Subject to any disclaimer, the term of this patent is extended or adjusted under 35 U.S.C. 154(b) by 0 days.

(21) Appl. No.: 12/529,005

(22) PCT Filed: Feb. 15, 2008

(86) PCT No.: PCT/EP2008/051831
§ 371 (c)(1),
(2), (4) Date: Aug. 27, 2009

(87) PCT Pub. No.: WO2008/104464
PCT Pub. Date: Sep. 4, 2008

(65) Prior Publication Data
US 2010/0114337 A1     May 6, 2010

(30) Foreign Application Priority Data

Feb. 27, 2007 (EP) .................................. 07103132

(51) Int. Cl.
*G05B 11/01* (2006.01)
*G06F 3/00* (2006.01)

(52) U.S. Cl.
USPC .............................................. 700/17; 715/700

(58) Field of Classification Search ............. 700/17; 715/700, 855; 345/421
See application file for complete search history.

(56) References Cited

U.S. PATENT DOCUMENTS 5,509,116 A * 4/1996 Hiraga et al. ................. 715/762
6,002,398 A * 12/1999 Wilson ......................... 715/777
(Continued)

FOREIGN PATENT DOCUMENTS

| EP | 660219 A2 | 6/1995 |
| EP | 1283484 A2 | 2/2003 |

(Continued)

OTHER PUBLICATIONS

PCT/ISA/210—International Search Report—Jun. 24, 2008.
(Continued)

*Primary Examiner* — Mohammad Ali
*Assistant Examiner* — Sivalingam Sivanesan
(74) *Attorney, Agent, or Firm* — Venable LLP; Eric J. Franklin

(57) ABSTRACT

A method for providing an improved engineering interface for configuring, maintenance or monitoring an industrial control system. The system includes a computer and a plurality of process graphics including software objects for controlling and/or monitoring real world objects controlled by the control system. A display of a process graphic is automatically generated in a window or designated view including a tab. The process graphic is selected dependent on one or more logical groupings, or hierarchical positions in a structure, in which control system software objects representing the control objects, the real world objects, belong or are arranged. A view of a structure group including a selected object is automatically displayed including tabs, each of which tab being linked to another structure group in a structure view that also contains an instance of the selected object. An engineer or other user can easily find and navigate to all instances of a selected object when configuring etc a control system. A system, a user interface and a computer program are also described.

34 Claims, 5 Drawing Sheets

U.S. PATENT DOCUMENTS

| | | | |
|---|---|---|---|
| 6,437,812 B1 * | 8/2002 | Giles et al. ............... 715/853 |
| 6,542,796 B1 | 4/2003 | Gibbs et al. |
| 6,559,871 B1 * | 5/2003 | Brozowski et al. ......... 715/853 |
| 6,628,311 B1 * | 9/2003 | Fang ...................... 715/777 |
| 6,694,513 B1 * | 2/2004 | Andersson et al. .......... 717/165 |
| 7,092,771 B2 * | 8/2006 | Retlich et al. ............. 700/72 |
| 7,165,221 B2 * | 1/2007 | Monteleone et al. ........ 715/738 |
| 2002/0046290 A1 * | 4/2002 | Andersson et al. .......... 709/237 |
| 2002/0113816 A1 * | 8/2002 | Mitchell et al. ............. 345/734 |
| 2002/0149602 A1 * | 10/2002 | Redpath et al. ............. 345/629 |
| 2004/0085367 A1 | 5/2004 | Hagarty, Jr. |
| 2006/0230356 A1 | 10/2006 | Sauve et al. |
| 2008/0066004 A1 * | 3/2008 | Blevins et al. ............. 715/771 |
| 2009/0216341 A1 * | 8/2009 | Enkerud et al. ............. 700/17 |

FOREIGN PATENT DOCUMENTS

| | | | |
|---|---|---|---|
| EP | 1376323 A1 | 1/2004 |
| EP | 1376323 A1 * | 1/2004 |
| WO | WO-01/02953 A1 | 1/2001 |
| WO | WO-01/15014 A2 | 3/2001 |
| WO | WO-2006/096792 A2 | 9/2006 |
| WO | WO-2006/103541 A1 | 10/2006 |
| WO | WO2006103541 * | 10/2006 |

OTHER PUBLICATIONS

PCT/ISA/237—Written Opinion of the Internatinal Searching Authority—Jun. 24, 2008.

* cited by examiner

METHOD AND SYSTEM FOR GENERATING A CONTROL SYSTEM USER INTERFACE

CROSS-REFERENCE TO RELATED APPLICATIONS

This application claims priority to European patent application 07103132.2 filed 27 Feb. 2007 and is the national phase under 35 U.S.C. §371 of PCT/EP2008/051831 filed 15 Feb. 2008.

TECHNICAL FIELD

The invention concerns method and system for automatically providing a user interface in an industrial control system. In particular an improved engineering interface suitable for configuring, maintenance or monitoring is provided for an industrial control system.

TECHNICAL BACKGROUND

In the supervisory control of industrial plants there is a requirement for accessing configuration information, set point information and so on for the all of the various equipment and processes controlled by a control system in an industrial installation. This information is typically accessed by authorised persons, engineers or other users, using features provided by the control system. Typically control systems comprise one or more distributed control systems (DCS) and/or supervisory control and data acquisition (SCADA) systems. With the increases in computing power and advances in communication and computerized measurement there is an increasing amount of data and other information available for the engineers and the other users.

The information is today often presented to the operators through a display screen showing process data (measurements, values), tag identifiers, equipment ID, alarm status, connections between plant equipment, etc. As more and more data is present in the control system, the visual user interfaces often hold very much information.

WO01/02953 describes a method for integration of many and various types of applications in a computerized system. This method is based on a concept where real world objects are represented as composite. Different facets of a real world object, such as its physical location, the current stage in a process, a control function, an operator interaction etc., are described as different aspects of the composite object. In this application, composite objects as defined by WO01/02953 are referred to as aspect objects.

A feature of the method described in WO01/02953 is that aspect objects can be organized in structures. A structure of aspect objects is a hierarchy of object instances. It may be based on any type of relations between aspect object instances. An aspect object can be placed in several structures at the same time, where the different structures represent different relations, e.g. functional and physical containment (functional structure and location structure). A further application of this approach to control system architecture is described in US-2002-0046290-A1. A meta object representing an entity is typically represented in several hierarchical structures at the same time within a control system. For example, a certain piece of process equipment has a certain position in a functional structure depending on the functional breakdown of the plant. It has also a physical position, and thus it has a place in a location structure. The same piece of equipment may currently be allocated to a certain production order, so it belongs to an order structure. Because it is used to produce a certain product, it also fits in a product structure.

In U.S. Pat. No. 6,002,398 entitled Navigation between property pages with tabs and menus, assigned to Novell, Inc., a method is described for displaying a tabbed dialog box, a property sheet, which has at least one child window. The parent window or property sheet has a multiple associated, displayable child windows. However at run time the described program loads all of the objects, including graphics, for all the child windows after user initiates the action which represents a heavy load on processor, display and system resources at runtime.

A software object in a control system is often represented in several structures and/or locations or functional or logical groupings in a control system. In the engineering phase, or during a maintenance or troubleshooting operation, the engineer is often in a situation where she needs information about the inclusion of a given object in several of the structures. Such plant control systems often use a software that generates a graphic representation of objects such as Plant Explorer, which gives a view of data structures much like the views provided by Microsofts Windows Explorer. In current systems, the engineer must manually navigate back and forth between the structures in the control system to find the other locations of the same object, or open several plant explorer windows and use one of these windows for each structural location.

SUMMARY OF THE INVENTION

This invention describes using a designated view for navigational purposes in an industrial control system. The designated view is normally placed alongside a structure view, and contains objects that act as links to other structures in the structure view. The objects in the designated view lead—when activated—to a new structure being loaded into the structure view. The objects in the designated view can be aligned along one or more rows, and can have a variety of graphical appearances. The objects in the designated view can be tabs, buttons, ribbons, links, or other similar objects. For clarity, tabs will henceforth be used to signify any type of objects that can be used as links to other structures in the designated views.

According to an aspect of the present invention an improvement is provided in the form of a method for providing an engineering interface for an industrial control system wherein a display device of said system is further arranged with a plurality of software objects for controlling and/or monitoring real world objects controlled by said control system, which said software objects are arranged in one or more of a plurality of hierarchical functional groups or structures, the method further comprising automatically generating a designated view arranged with one or more tabs, and each one or more tabs being linked to a said hierarchy of object instances or a said structure containing the selected software object, and displaying one or more tabs each arranged to display a structure containing the said selected software object.

According to an embodiment of the present invention an improvement is provided in the form of a method for providing an engineering interface for an industrial control system wherein a display device of said system is further arranged with a plurality of software objects for controlling and/or monitoring real world objects controlled by said control system, said software objects are arranged in one or more of a plurality of hierarchical functional groups or structures, the method further comprising displaying, on selection of a tab, a structure group in a view wherein the said structure group is expanded to display the location of the selected object in a structure or hierarchical group.

According to an embodiment of the present invention an improvement is provided in the form of a method for providing an engineering interface for an industrial control system wherein a display device of said system is further arranged with a plurality of software objects for controlling and/or monitoring real world objects controlled by said control system, said software objects are arranged in one or more of a plurality of hierarchical functional groups or structures, the method further comprising generating a designated view based on the plurality of locations of the selected software object in said hierarchical functional groups or structures.

According to an embodiment of the present invention an improvement is provided in the form of a method for providing an engineering interface for an industrial control system wherein a display device of said system is further arranged with a plurality of software objects for controlling and/or monitoring real world objects controlled by said control system, said software objects are arranged in one or more of a plurality of hierarchical functional groups or structures, the method further comprising detecting one or more software objects arranged in several different levels in a hierarchy or structure and generating automatically one or more tabs in a designated view arranged in a subtab of a designated view relative to a higher level designated view, providing direct access via the tabs of the subtab to other objects or structures.

According to an embodiment of the present invention an improvement is provided in the form of a method for providing an engineering interface for an industrial control system wherein a display device of said system is further arranged with a plurality of software objects for controlling and/or monitoring real world objects controlled by said control system, said software objects are arranged in one or more of a plurality of hierarchical functional groups or structures, the method further comprising selecting the one or more said software objects dependent on a logical grouping of a selected process diagram in which an instance of said software object is arranged.

According to an embodiment of the present invention an improvement is provided in the form of a method for providing an engineering interface for an industrial control system wherein a display device of said system is further arranged with a plurality of software objects for controlling and/or monitoring real world objects controlled by said control system, said software objects are arranged in one or more of a plurality of hierarchical functional groups or structures, the method further comprising automatically generating a designated view, in which the tab contents are dependent on which hierarchical structures a said software object is instantiated in.

According to an embodiment of the present invention an improvement is provided in the form of a method for providing an engineering interface for an industrial control system wherein a display device of said system is further arranged with a plurality of software objects for controlling and/or monitoring real world objects controlled by said control system, said software objects are arranged in one or more of a plurality of hierarchical functional groups or structures, the method further comprising displaying, on detection of a user input relative to a tab, information or a value related to the structure group.

According to an embodiment of the present invention an improvement is provided in the form of a method for providing an engineering interface for an industrial control system wherein a display device of said system is further arranged with a plurality of software objects for controlling and/or monitoring real world objects controlled by said control system, said software objects are arranged in one or more of a plurality of hierarchical functional groups or structures, the method further comprising displaying, on detection of a user input relative to a tab dynamic information or a updatable value related to the structure group.

According to an embodiment of the present invention an improvement is provided in the form of a method for providing an engineering interface for an industrial control system wherein a display device of said system is further arranged with a plurality of software objects for controlling and/or monitoring real world objects controlled by said control system, said software objects are arranged in one or more of a plurality of hierarchical functional groups or structures, the method further comprising hiding a given designated view arranged with one or more tabs when one or more conditions are met.

According to an embodiment of the present invention an improvement is provided in the form of a method for providing an engineering interface for an industrial control system wherein a display device of said system is further arranged with a plurality of software objects for controlling and/or monitoring real world objects controlled by said control system, said software objects are arranged in one or more of a plurality of hierarchical functional groups or structures, the method further comprising detecting a computer cursor or mouse pointer position on or over a tab and displaying a small graphic or thumbnail of a structure view linked to by the said tab.

According to an embodiment of the present invention an improvement is provided in the form of a method for providing an engineering interface for an industrial control system wherein a display device of said system is further arranged with a plurality of software objects for controlling and/or monitoring real world objects controlled by said control system, said software objects are arranged in one or more of a plurality of hierarchical functional groups or structures, the method further comprising recording a manual configuration of the designated view.

According to an embodiment of the present invention an improvement is provided in the form of a method for providing an engineering interface for an industrial control system wherein a display device of said system is further arranged with a plurality of software objects for controlling and/or monitoring real world objects controlled by said control system, said software objects are arranged in one or more of a plurality of hierarchical functional groups or structures, the method further comprising recording a manual configuration of the designated view in which a logical grouping is selected and configured by a user to be any from the group of: tasks frequently carried out, tasks for start up, tasks for maintenance, custom selection of other tasks.

The improved interface of the invention provides a method and system for simplifying the process of doing engineering work for a control system of an industrial installation or manufacturing a plant. The interface provides direct access to all structural locations of a selected object so that the engineer or other user can simply and quickly navigate back and forth between the identified locations to perform the engineering task. The invention provides quick-access links activated by selecting a tab in order to access each other structure where the currently selected object is present. Each location other than the current structure where the currently selected object is located is presented to the user as one or more tabs arranged in relation to the structure tree view. When the user clicks the tab, the referred structure is pulled into view in the current window pane, highlighting the selected object and expanding the tree structure to show the selected object.

The information about in which structures an object is present in is stored in the control system in some way, stored for example as aspects of the object. However, it can be difficult for the system engineers to find this information, especially when the list of locations containing a representation of the selected object is long. The aspects representing the structures to which a selected object belongs structural may also not be of the same aspect type, so one cannot easily get an overview of all structures, but must visually search through the list of aspects to find all references to structures.

Thus the improved interface helps system engineers to navigate between the different structural locations of an object when doing engineering/configuration work on a control system. This is achieved on the improved interface by providing the operators and system engineers with a designated view arranged with a tab row or rows (tab view) for seeing and navigating between structural locations of an object in the system.

An important advantage of the improved interface is that it saves time when carrying out engineering or maintenance work on a control system implementation. It saves time partly through avoiding having the engineer search and scroll through the aspect list to find the structure node aspects. It saves time as well because it is quick and easy to skip between structure locations by selecting the tabs presented in the improved interface. Another advantage is that the improved interface gives a new overview by means of the visualisation of the structural locations of an object. When the list is displayed in a form that is more graphic than a list of text entries the engineer avoids missing a location that is in the aspect list.

This invention may use the hierarchical structures of objects in an industrial control system to automatically generate and configure tabs for navigating or browsing. Tabbed browsing is a method of moving from one page to another page by clicking on a tab, a method which has been used in office applications and web browsers, but only for already-open windows. However, according to the invention certain designated views which are arranged with tabs are generated by automatically reading the hierarchical object structure in the control system software and grouping structures according to their relationship to a selected object, so that the tabs can be generated automatically.

In addition to determining tab contents based on the structures' relationship to an object, the tab contents can be automatically defined by other facets of the structures or there can be manual definitions of tab contents, e.g. according to user preference, site preference, favourites, or other tasks such as frequently carried out, tasks for start up, tasks for maintenance, or custom selection of other tasks.

Configuration and interaction with navigation tabs can be related to a system, a state of the system, a specific user task, different types of users and to accompany specific user preferences as recorded for example in user profile, user or needs. On a system level it is important to relate the grouping arranged with a navigation tab to an application of the system or a task that is to be preformed. It is also possible to implement this as specific workplaces tailored to the application or task to be preformed. These specific workplaces use the tabs to be able to access the appropriate information for the application or task and easily switch between a plurality of appropriate displays. For example these may be operations such as start up, operate, change operation, alarm handling tasks, specific process related tasks, maintenance tasks, active or past work orders, emergency actions, shut down and so on.

In addition, the user interface may also be arranged to adapt according to user preferences, system state or current work tasks. The advantage of this mode is that it supports active exploration into the system by the operators.

Embodiments of the invention may advantageously be used for control purposes in a control system of an oil or gas production, storage, treatment or process installation. In particular it is an advantage that industrial control systems, which typically comprise containing hundreds and thousands of software entities may be configured and investigated in a way that reduces engineer fatigue and contributes to improved quality of engineering. This is of particular importance in those industries with strict safety demands for processes that include hazardous materials such as oil or gas. Embodiments of the invention may also be used for control purposes in a control system for other industrial, manufacturing or process installations, such as in the pulp & paper, oil & gas, chemistry & life sciences, and transportation industries (such as railway control systems), and also used in an installation for generation, transmission or distribution of electrical energy.

In a preferred embodiment of the methods of the invention one or more methods may be carried out by a computing device comprising one or more microprocessor units or computers. The control unit(s) comprises memory means for storing one or more computer programs for carrying out the improved methods. Preferably such computer program contains instructions for the processor to perform the method as mentioned above and described in more detail below.

BRIEF DESCRIPTION OF THE DRAWINGS

Embodiments of the invention will now be described, by way of example only, with particular reference to the accompanying drawings in which.

DETAILED DESCRIPTION OF THE EMBODIMENTS

This invention describes a system for and a method of engineering, which may comprise configuration or investigation tasks in a control system, using an improved interface for an industrial control system. The improved interface comprises a designated view, that is, an area of a display window arranged with a tab used for navigating between different structures of software objects, described in a European application EP 07103132.2 entitled "Method and system for generating a control system user interface" and assigned to ABB, and hereby incorporated in this specification in full by means of this reference.

In order to explain the principles involved in the invention the window including a structure view and designated view will first be described.

Figure 1:
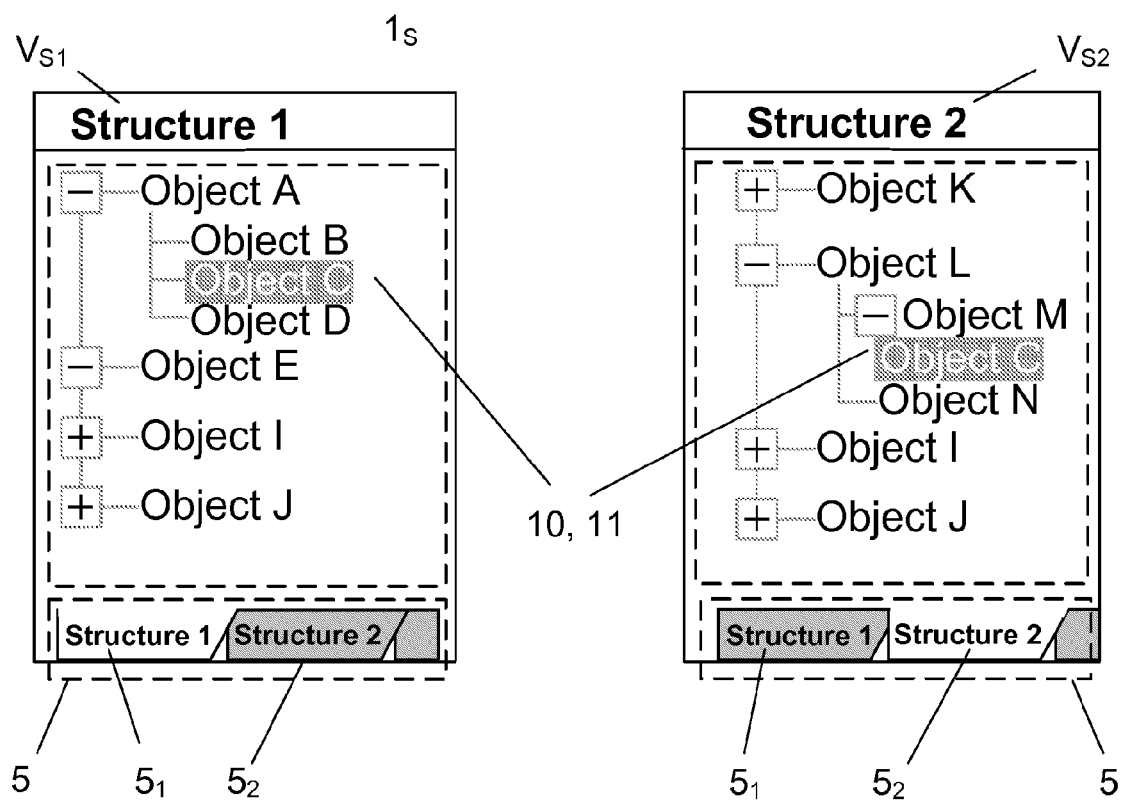
FIG. 1 is a schematic diagram for a display with a structure view and a designated view, showing two instances of an object in a two different structures according to an embodiment of the invention.

FIG. 1 shows two windows, each arranged with a designated view containing tabs, and a structure view. Each structure view displays a structure group that contains a selected software object, Object C. The figure shows two structure views $V_{S1}$, $V_{S2}$ where structure view $V_{S1}$ contains a structure group Structure 1 and structure view $V_{S2}$ which displays Structure 2. A software object, Object C is denoted by the numerals 10, 11. Object C is highlighted, selected, in both of the two different structures. In the interface $1_S$ each such tab window such as $V_{S1}$, may take up the whole display area of a display screen. By selecting in window Structure 1 the tab $5_2$, also marked Structure 2, the display of Structure 2, right side of figure, is then displayed. By selecting the grayed tab $5_1$, also marked Structure 1 in the display of the window containing Structure 2, the first window $V_{S1}$ is then displayed showing Structure 1. The display thus shows each group Structure 1 and Structure 2 which each contains an instance of the selected Object C. The engineer or other user may switch to different structures containing the selected object, in this case Object C, by clicking on one or other of the tabs that are created in the designated view 5 etc.

Figure 2:
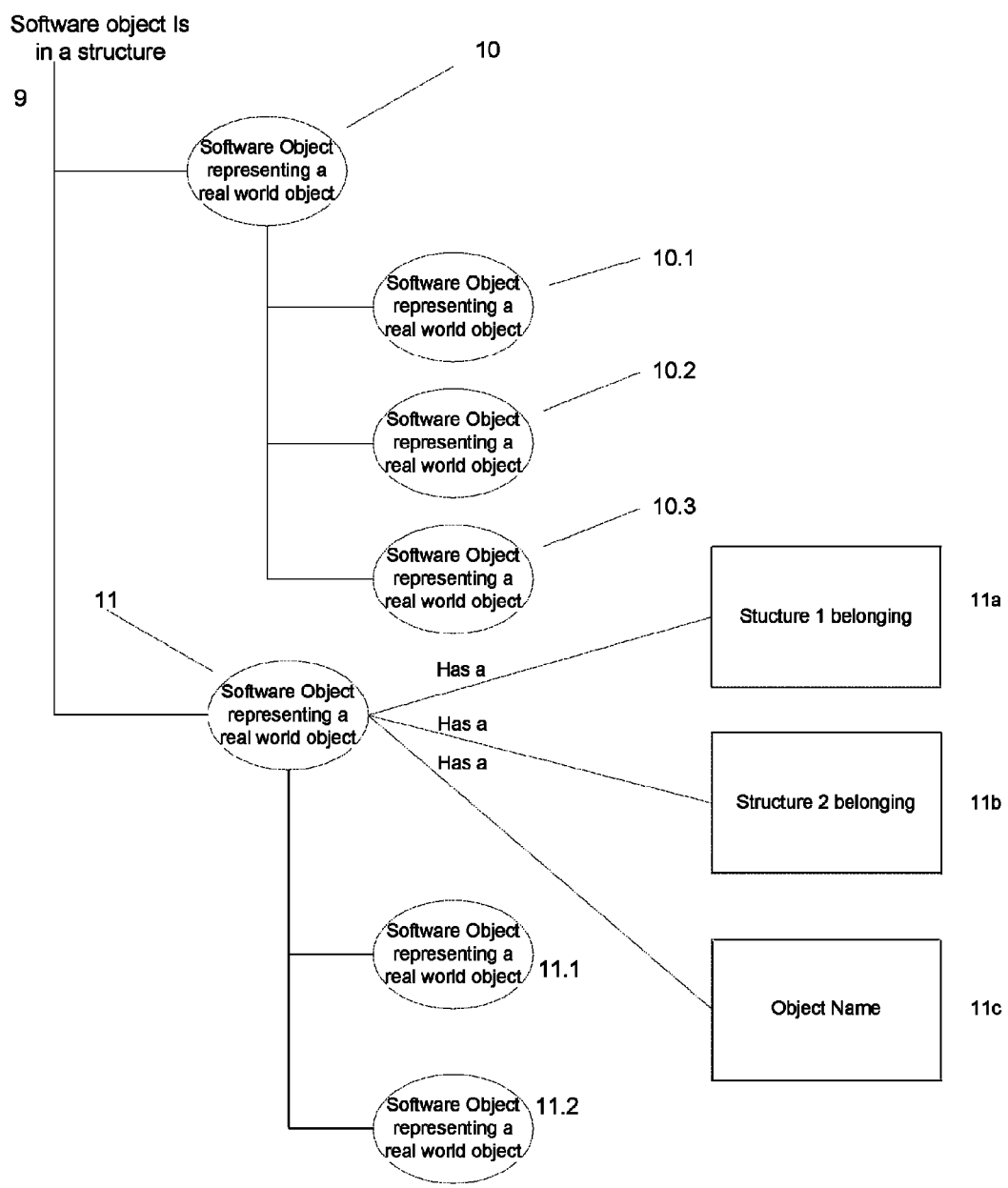
FIG. 2 is a block diagram showing an arrangement of a group containing software objects linked in a hierarchical way with child objects in accordance with description of the designated view or tab window according to an embodiment of the invention.

Object C may be a software object such as software object 10 or 11 as shown in FIG. 2 in a structure similar to structure 9 of FIG. 2.

FIG. 2 shows an arrangement of software entities and a data structure and a naming convention used in this description. FIG. 2 shows a software architecture structure or software structure 9 of an industrial control system (not shown) in which are arranged two software objects 10, 11, each of which are also arranged with one level of software objects 10.1, 10.2, 10.3 and 11.1-3. A software object may also, as in the case shown for software object 11, comprise one or more software entities called here Aspect objects 11a, 11b, 11c. The software objects 10, 11, each represent some facet of a real world object for a control purpose. A facet of a real world object represented in a control system may also be referred to as a control object. Structure 9 is a hierarchy of object instances. A software object such as 10 or 11 can be placed in several different structures at the same time (11a and 11b), where the different structures represent different relations, e.g. functional and physical containment. Each software object also comprises aspect objects representing their relation to the structures the software object is instantiated in.

By means of this architecture and method of relating and linking software entities to each other, different relations between the same objects may be engineered and controlled. Relations between the same objects such as an objects position in a functional structure eg electrical system, in a process section, in a piping layout are engineered and arranged for control and monitoring; likewise a location structure may be engineered to link objects in a building location, area location, room location, on which storey or level, in which room and so on may be engineered and controlled in a logical and rational manner. The same pump or filter may be represented in a process diagram, a location in a plant by building, floor, and area etc as well as in an electrical diagram, a detail process diagram, a process piping diagram and so on, which may be in a similar way as the structures described in WO01/02953 or US-2002-0046290-A1, of which the latter is hereby incorporated in this specification in its entirety by means of this reference.

Thus software object 11 comprises in some way an associated aspect object 11a which is a means for referencing a structure to which the software object 11 belongs. There is also an aspect object for another reference to another structure 11b to which the software object belongs, and there is an aspect object for the name of the software object 11c. The aspect object 11a may be used to display a tab in a designated view of the control system user interface. The Object name 11c of the software object representing the device (or function) that the Structure aspect 11b, structure aspect 11a etc are associated with is held by the Software Object 11.

Thus this invention may be arranged to use the structures of objects in a software architecture of a control system, such as the control system supplied by ABB called System 800×A, to automatically generate tabs for browsing or navigating in a complex hierarchical system. The tabs may be configured automatically. By automatically reading the hierarchical object structure aspects and grouping objects according to their level in a tree structure, the tabs can be generated automatically. There are different ways to group these software objects in a view selected by a tab, based on the logical structure and/or relationships between them.

As necessary more than one array of tabs may be grouped according to a predetermined criterion.

Figure 4:
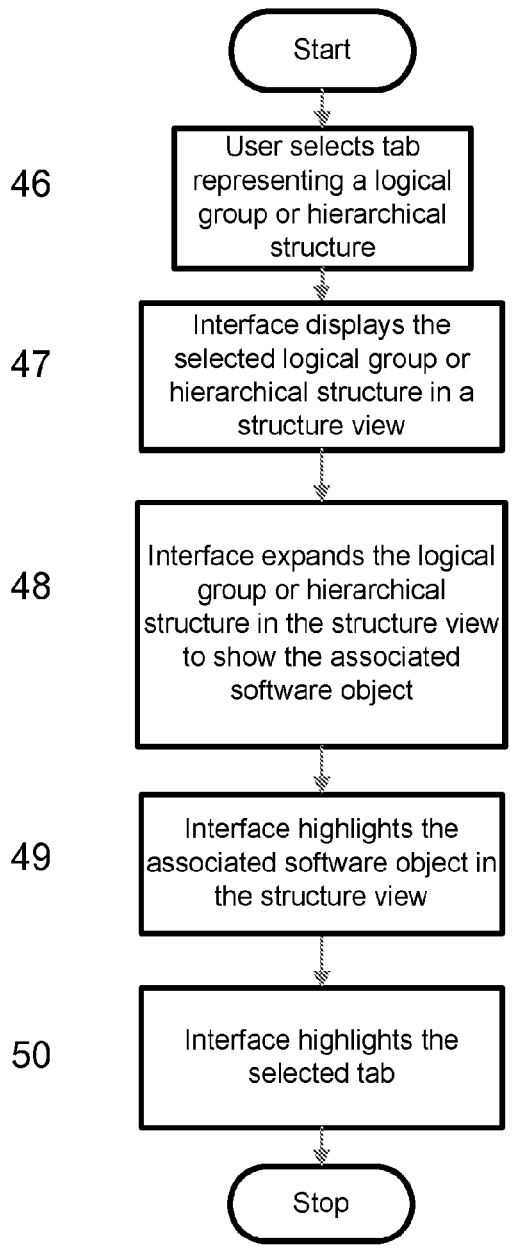
FIG. 4 is a flowchart for a method to display a user interface for an industrial control system with a structure view and a designated view, showing each instance of an object in the structures according to an embodiment of the invention.

FIG. 4 shows a flowchart for a method for the engineer or other user to investigate another structure group that also contains the object of interest, eg. Object C by:

46. User selects a tab in the designated view; eg by clicking on the tab or using a keyboard command such as "Alt+Tab",
47. Interface displays the selected logical group or hierarchical structure in a structure view,
48. Interface expands the view to show the object of interest in the corresponding level of the logical group or hierarchical structure,
49. Interface highlights the software object of interest in the structure view,
50. Interface highlights the selected tab.

Figure 3:
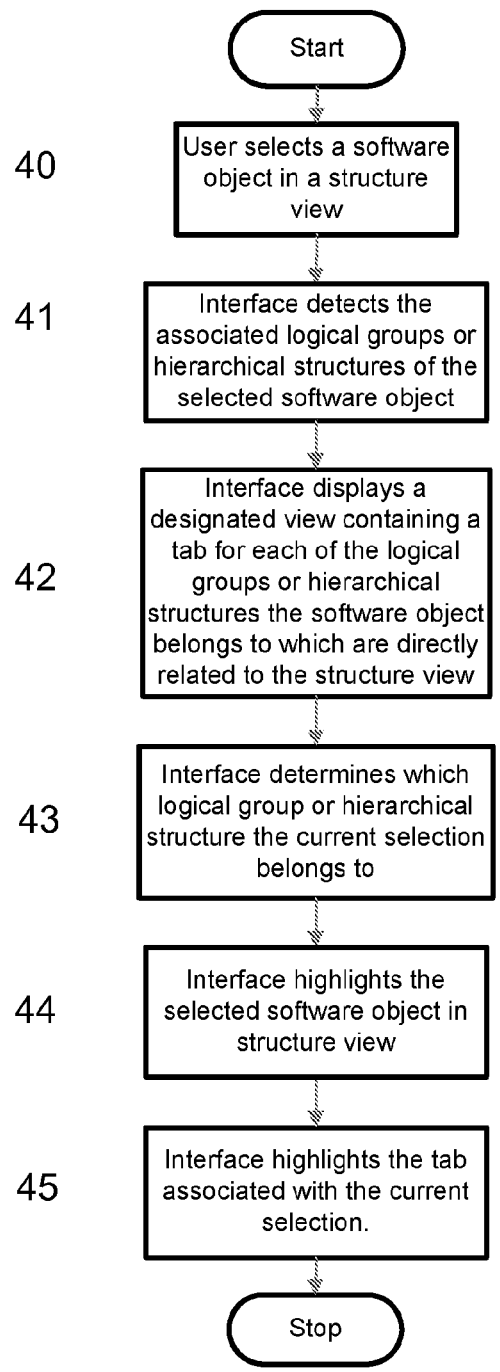
FIG. 3 is a flowchart for a method to display a user interface for an industrial control system with a structure view and a designated view, the user interface showing each instance of an object in the structures according to an embodiment of the invention.

FIG. 3 shows a flowchart for a method for the system to provide the engineer or other user with means to investigate all structure groups that also contains the object of interest, eg Object C, by:

40. User selects a software object in a main view or a structure view; eg by clicking on an icon or other visual object representing the software object in the structure view,
41. Interface detects all of the associated logical groups or hierarchical structures related to the selected software object in the structure view;
42. Interface displays a designated view with tabs for each of the logical groups or hierarchical structures for the selected software object
43. Interface determines which logical group or hierarchical structure the current selection belongs to;
44. Interface highlights the software object at the corresponding level in the logical group or hierarchical structure in the structure view;
45. Interface highlights tab associated with the selected software object;

A designated view arranged with tabs can also be configured based on the user or the user's role, workstation or other personalization criteria. The user's role or privileges may for example be detected on log-in, according to privileges etc linked to a workstation at which a person logs in and/or to an identity of the person logging in. Certain of the tabs can be visualized with distinguishing factors based on type or level.

It is important that different functional information on a display may be quickly identified according to its purpose by a user, and with a minimum of effort. This is particular important for the user to find the most relevant information for the task at hand. Functionally appropriate and task adapted or user-adapted displays are also important to reduce unnecessary effort which may lead to operator fatigue.

The tabs can be implemented as one object on the top-level of the control system, or one object for each of the functional areas. The tabs can also be arranged into a separate panel, so the tabs do not need to be included or visible in all structure view panels. A separate panel also allows the tabs to be used in different functions or visualisations in the operator interface. The tab configuration can also include filtering, hiding or security aspects to only include objects relevant to an operator interface.

As described above tab configuration can be configured or engineered to relate to working tasks, system status, security settings, user privileges and user preferences. There are at least two basic ways to relate presentation objects in a tabbed view. The tab view can either be predefined to include a set of objects or configured based on properties of the software objects. These two approaches are not exclusive and a single object can relate to both predefined tabs and to a local tab for a group of software objects used in a single presentation. Predefined tabs may relate to work tasks, system states, user preferences or user privileges. Local tabs may for example relate information types.

In performing different tasks and in the engineering of different process functions, the operator will have different requirements for information. That means that the information availability needs to be context sensitive. An example of different tasks that creates specific information needs and increased workload for the operator is engineering object types that are designed to be used for different functions in the system and engineering the layout or hierarchy of objects representing the real-world objects in the plant. In one case it is important to have a good overview of the all the structural relationships of an objects, while the other case is less sensitive to this and requires a good way of accessing a subset of the structural relationships.

Figure 5:
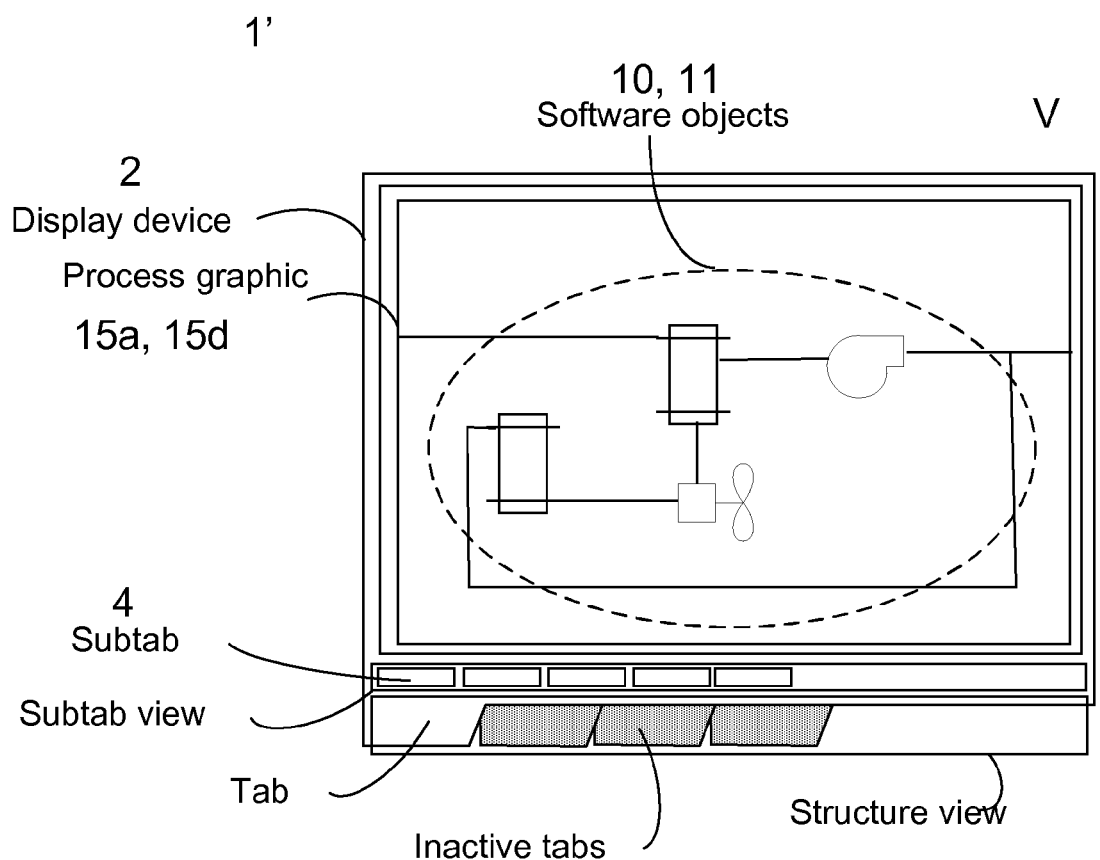
FIG. 5 is a schematic diagram for a display with a process graphic, and a designated view, according to another embodiment of the invention.

FIG. 5 shows schematically a display on a display device 2 showing a process graphic in a designated view, a structure view V, and a subtab view. The process graphic 15a-15d comprises software objects 10, 11 such as those previously described in relation to eg FIG. 2. The display device 2 schematically displays an interface on a main part of a graphical display. On a secondary part of the graphical display a Stucture view 5 is shown including six tabs, of which one is blank to indicate that it is currently selected, and three tabs shown with a pattern (grayed) to indicate not-selected or inactive. In addition, a second row of tabs, subtabs 4 are shown on the display. The subtabs provide access to process graphics present which are logically related the selected tab (which selected tab represents a given process graphic from a higher level in the structure).

Navigating by tabs between different hierarchical structures, to or from different software objects is thus provided by tabs. The tabs provided by the invention may be likened to a set of simple signposts for navigating in an otherwise array of complex and hierarchical entities. The set of tabs is automatically generated from the underlying software object architecture, the structure aspects.

Maintenance personnel, for example, need specific information in order to plan maintenance, such as run-time measurements, vibration measurements, maintenance alerts/alarms, active or past work orders connected to the equipment etc. Specific tabs with maintenance information can be made available to maintenance personnel, allowing him or her to work in the same system as the control room operators but with different information presented or the same type of information presented but grouped in different ways depending on a maintenance etc function or task.

The invention relates to systems that are used by operators in control rooms today, but may also be very relevant for new types of control room interfaces. Current control room interfaces are normally based on desktop computers with one or more desktop monitors and/or one or more large screens. The concept could be used in such a setting, but it could also be used for mobile interaction devices such as tablet-pc's, mobile phones, electronic paper, virtual or augmented reality systems, PDAs, multi-modal interfaces, etc.

The method can be used on any system for process information visualization that is used to present groups of information that can be of varying relevance to the operator depending on the current context. The process visualization system can for example be P&ID based graphics, abstraction hierarchies, model-based representations, 3D visualizations or abstract visualizations of process information. A description of a 3D representation of an industrial process arranged in conjunction with a control system is described in U.S. application Ser. No. 60/6677,080, which specification is hereby included in its entirety by means of this reference. As described in reference to a preceding embodiment, the tab $5_1$, $5_2$ of a designated view 5, is automatically generated based on the structures of hierarchical software object relationships and used to navigate to one or more parts of the control system. The tabs thus represent alternative navigation opportunities for the operator, so clicking on a tab will take the operator to a different location in the control system. In this embodiment, the tabs are thus mainly a means for navigating between several instances of a software object in different logical groups or hierarchical structures. This to be understood to be in stark contrast to the concept of using tabs for managing open windows.

In another embodiment, a tab may be arranged to display all instances of the same object which exist in some or all structures. Thus the position or location of all instances of the same object is found and the result displayed in one or more simple formats. In this embodiment certain tabs are used to show all locations of this object in different structures. This is a frequently used function during configuration, maintenance or other operations in which the presence or location of a particular object has to be determined.

In another embodiment a tab ($5_1$, $5_2$) of a designated view (5), may be arranged to display a reduced scale or thumbnail picture of the structure view that the tab, on selection, leads to. This gives the user a preview or a guide, activated for example on mouse roll over, that is to say, by the user positioning a cursor or mouse pointer over the tab. When a thumbnail or a static thumbnail is used, additional information may be added to the image. For example one or more simple indicators, representing a blinking lamp or similar, may be superimposed on the thumbnail of the structure view to show an event or status in the control system.

In a development, the small images or thumbnail pictures may be arranged to appear on command relative to a designated tab view, and a keyboard command such as "Ctrl+Tab" or other command used to switch between tabs arranged in designated views.

Methods of the invention may be supervised, controlled or carried out by one or more computer programs. One or more microprocessors (or processors or computers) comprise a central processing unit CPU connected to or comprised in one or more of the above described crane control units, which processors, PLCs or computers perform the steps of the methods according to one or more aspects of the invention, as described for example with reference to FIGS. 3-4. It is to be understood that the computer programs for carrying out methods according to the invention may also be run on one or more general purpose industrial microprocessors or PLCs or computers instead of one or more specially adapted computers or processors.

The computer program comprises computer program code elements or software code portions that make the computer or processor perform the methods using equations, algorithms, data, stored values, calculations, synchronisations and the like for the methods previously described, and for example in relation to the flowcharts of FIGS. 3-4, and/or to the graphic user interfaces shown in FIGS. 1, 3a, 3b. A part of the program may be stored in a processor as above, but also in a ROM, RAM, PROM, EPROM or EEPROM chip or similar memory means. The or some of the programs in part or in whole may also be stored locally (or centrally) on, or in, a memory storage device of a control system, and/or on suitable computer readable medium such as a magnetic disk, CD-ROM or DVD disk, hard disk, magneto-optical memory storage means, in volatile memory, in flash memory, as firmware, or stored on a data server. Other known and suitable media, including removable memory media, a USB memory stick and other removable flash memories, hard drives etc. may also be used. The program may also in part be supplied or updated from a data network, including a public network such as the Internet.

It should be noted that while the above describes exemplifying embodiments of the invention, there are several variations and modifications which may be made to the disclosed solution without departing from the scope of the present invention as defined in the appended claims.

The invention claimed is:

1. A method for providing an engineering interface for an industrial control system comprising a computer and a display device, said system further comprising a plurality of process graphics comprising at least one software object for controlling and/or monitoring real world objects controlled by said control system, wherein said software objects are arranged in at least one of a plurality of hierarchical functional groups or structures, the method comprising:
automatically generating a designated view comprising a plurality of tabs, arranging each of said plurality of tabs with a link to said hierarchy of object instances or structures comprising a selected software object comprised in said process graphic, and
displaying the plurality of tabs, wherein each tab is arranged to graphically display a structure group comprising said selected software object in a different point in said hierarchy of object instances or structures and graphically display objects nearby said selected object in said structure group and relationships of the nearby objects and the selected object.

2. The method according to claim 1, further comprising:
displaying, on selection of a tab, a structure group in a view wherein said structure group is expanded to display the location of the selected object in a structure or hierarchical group.

3. The method according to claim 1, further comprising:
generating a designated view based on the plurality of locations of the selected software object in said hierarchical functional groups or structures.

4. The method according to claim 3, further comprising:
detecting at least one software object arranged in several different levels in a hierarchy or structure, and
generating automatically at least one tab in a designated view arranged in a subtab of a designated view relative to a higher level designated view, providing direct access via the tabs of the subtab to other objects or structures.

5. The method according to claim 1, further comprising:
selecting the at least one software object dependent on a logical grouping of a selected process diagram in which an instance of said software object is arranged.

6. The method according to claim 1, further comprising:
automatically generating a designated view, in which contents of the tab are dependent on which hierarchical structures said software object is instantiated in.

7. The method according to claim 1, further comprising:
determining which tab to highlight in the designated view based on which said software object is currently selected in the interface.

8. The method according to claim 1, further comprising:
displaying, on detection of a user input relative to a tab, information or a value related to the structure group.

9. The method according to claim 1, further comprising:
displaying, on detection of a user input relative to a tab dynamic information or a updatable value related to the structure group.

10. The method according to claim 1, further comprising:
maintaining a given designated view comprising at least one tab reflecting the current state of the functional groups or structures of software objects.

11. The method according to claim 1, further comprising:
hiding a given designated view comprising at least one tab when at least one condition is met.

12. The method according to claim 1, further comprising:
displaying context-sensitive information in a sub tab view of the selected tab view.

13. The method according to claim 1, further comprising:
detecting a computer cursor or mouse pointer position on or over a tab and displaying a small graphic or thumbnail of a structure view linked to by the tab.

14. The method according to claim 1, further comprising:
recording a manual configuration of the designated view.

15. The method according to claim 14, further comprising:
recording a manual configuration of the designated view in which a logical grouping is selected and configured by a user to be any from the group of: tasks frequently carried out, tasks for start up, tasks for maintenance, custom selection of other tasks.

16. A computer program product, comprising:
a non-transitory computer readable medium; and
computer program instructions recorded on the computer readable medium and executable by a processor for providing a user interface for an industrial control system comprising a computer and a plurality of process graphics comprising software objects for controlling and/or monitoring real world objects controlled by said control system, said program instructions making a computer or processor carry out a method comprising automatically generating a designated view comprising a plurality of tabs, arranging each of said plurality of tabs with a link to said hierarchy of object instances or structures comprising a selected software object comprised in said process graphic, and displaying the plurality of tabs, wherein each tab is arranged to graphically display a structure group comprising said selected software object in a different point in said hierarchy of object instances or structures and graphically display objects nearby said selected object in said structure group and relationships of the nearby objects and the selected object.

17. A engineering interface for an industrial control system comprising a computer and a display device, said system further comprising a graphic user interface comprising a plurality of process graphics comprising at least one software object for controlling and/or monitoring real world objects controlled by said control system, wherein said software objects are arranged in at least one of a plurality of hierarchical functional groups or structures, arranged such that elements of at least one of at least a portion of the at least one software object may be displayed on said engineering interface displayed on said display device, said engineering interface comprises a computer program comprising program code for
automatically generating a designated view comprising a plurality of tabs, arranging each of said plurality of tabs with a link to said hierarchy of object instances or structures comprising a selected software object comprised in said process graphic, and
displaying the plurality of tabs, wherein each tab is arranged to graphically display a structure group comprising said selected software object in a different point in said hierarchy of object instances or structures and graphically display objects nearby said selected object in said structure group and relationships of the nearby objects and the selected object.

18. An industrial control system with improved engineering interface for an industrial control system comprising a computer and a display device, said system further comprising a plurality of process graphics comprising at least one software object for controlling and/or monitoring real world objects controlled by said control system, wherein said software objects are arranged in at least one of a plurality of hierarchical functional groups or structures, arranged such that elements of at least one of at least a portion of the at least one software object may be displayed on said engineering interface displayed on said display device, wherein the user interface of the control system comprises a computer program comprising program code for
automatically generating a designated view comprising a plurality of tabs, arranging each of said plurality of tabs with a link to said hierarchy of object instances or structures comprising a selected software object comprised in said process graphic, and
displaying the plurality of tabs, wherein each tab is arranged to graphically display a structure group comprising said selected software object in a different point in said hierarchy of object instances or structures and graphically display objects nearby said selected object in said structure group and relationships of the nearby objects and the selected object.

19. The industrial control system according to claim 18, further comprising:
a computer input element arranged for detection of selection of a tab, and
display elements configured to display a structure group in a designated view linked to the selected tab wherein the designated view comprises a tab for each other structure group comprising a selected object of interest.

20. The industrial control system according to claim 18, further comprising:
software elements configured to display on selection of a tab, a structure group including an instance of the object of interest in a designated view of the selected tab.

21. The industrial control system according to claim 18, further comprising:
a computer program or software for
detecting at least one software object arranged in several different levels in a hierarchy or structure, and
generating automatically at least one tab in a designated view or structure group view arranged in a subtab of a designated view.

22. The industrial control system according to claim 18, further comprising:
a computer program or software for displaying a designated view or structure tab view of a process graphic comprising one or more operational elements being any of the group of: process section name, device name, dynamic information, information about a as number of alarms, plots or trends, dynamic measurements, key performance indicators.

23. The industrial control system according to claim 18, further comprising:
a computer program or software and/or hardware for displaying, on detection of a user input relative a tab, information or a value of a variable in a process section related to the process graphic view or structure group tab view.

24. The industrial control system according to claim 18, further comprising:
a computer program or software and/or hardware for updating the objects or refreshing the links in a designated view with a tab or structure group tab view.

25. The industrial control system according to claim 18, further comprising:
a computer program or software and/or hardware module configured to receive in the control system a manual request to update at least one object in a designated view.

26. The industrial control system according to claim 18, further comprising:
a computer program and data network according to an OPC or similar protocol for updating or refreshing the data links of a designated view or structure group tab view.

27. The industrial control system according to claim 18, further comprising:
a computer program or software for maintaining a given designated view comprising a tab visible at all times on an operator display.

28. The industrial control system according to claim 18, further comprising:
a computer program or software for hiding a given designated view comprising a tab on an operator display when at least one condition is met.

29. The industrial control system according to claim 18, further comprising:
a computer program or software and/or hardware for generating a designated view or structure group tab view comprising a tab or similar, further comprising a selection element configured to select utilizing layers which of the available items of said information shall be visually displayed or otherwise presented prominently, or displayed less prominently, or hidden.

30. The industrial control system according to claim 18, further comprising:
a computer program arranged for detection of a graphic interface computer input action of a mouse pointer hover, mouse over or mouse roll over on or near a tab of a designated view or structure tab view.

31. The industrial control system according to claim 18, further comprising:
a computer program arranged for detection of a computer keyboard key-combination or key sequence input action relative to said at least one tab of a designated view or structure tab view selecting or activating said tab.

32. The industrial control system according to claim 18, further comprising:
a computer program and data network comprising hardware and software arranged for receiving in the control system a manual request to update the data links or objects in a designated view, and updating said designated view with all new data and/or new objects.

33. The industrial control system according to claim 18, wherein the user interface comprises a computer program comprising display elements configured to automatically display at least one selected tab that is displayed dependent on a status of a process controlled by said control system, the status comprising and not limited to any from the group of: start, run, process change, event, alarm, stop, offline, configuration or maintenance, simulation.

34. A method for navigating in an industrial control system comprising an engineering interface, a computer, and a display device said system further comprising a plurality of process graphics comprising at least one software object for controlling and/or monitoring objects controlled by said control system, wherein said at least one software object is arranged in at least one of a plurality of hierarchical functional groups or structures, arranged such that elements of at least one of at least a portion of the at least one software object may be displayed on said engineering interface displayed on said display device, the method comprising:
automatically generating a structure tab view comprising a plurality of one tabs,
arranging each of said one tabs with a link to said hierarchy of object instances or structures comprising the at least one software object in a different point in said hierarchy of object instances or structures, and
displaying in the structure tab view one structure tab for each hierarchy of object instances, or each said structure comprising a selected software object comprised in said process graphic, and graphically display in the structure tab view a structure group comprising said selected software object in a different point in said hierarchy of object instances or structures objects nearby said selected object in said structure group and relationships of the nearby objects and the selected object.

* * * * *

UNITED STATES PATENT AND TRADEMARK OFFICE
CERTIFICATE OF CORRECTION

| | | |
|---|---|---|
| PATENT NO. | : 8,417,357 B2 | Page 1 of 1 |
| APPLICATION NO. | : 12/529005 | |
| DATED | : April 9, 2013 | |
| INVENTOR(S) | : Husoy et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 601 days.

Signed and Sealed this
Seventh Day of October, 2014

Michelle K. Lee
*Deputy Director of the United States Patent and Trademark Office*